United States Patent
Desai et al.

(10) Patent No.: US 8,318,229 B2
(45) Date of Patent: Nov. 27, 2012

(54) METHOD FOR CONTROLLING BULK DENSITY OF FRIED SNACK PIECES

(75) Inventors: Pravin Maganlal Desai, Carrollton, TX (US); John Mampra Mathew, Plano, TX (US); Gerald James Vogel, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 1761 days.

(21) Appl. No.: 11/041,399

(22) Filed: Jan. 24, 2005

(65) Prior Publication Data

US 2006/0165859 A1 Jul. 27, 2006

(51) Int. Cl.
*A23L 1/01* (2006.01)

(52) U.S. Cl. ......... 426/438; 426/446; 426/637; 426/808

(58) Field of Classification Search .................. 426/438; 99/404

See application file for complete search history.

(56) References Cited

U.S. PATENT DOCUMENTS

| | | | |
|---|---|---|---|
| 2,286,644 A | 6/1942 | Pringle | |
| 2,934,001 A | 4/1960 | Cunningham et al. | |
| 3,132,949 A * | 5/1964 | Crowe | 426/439 |
| 3,149,978 A | 9/1964 | Anderson | |
| 3,608,474 A | 9/1971 | Liepa | |
| 3,626,466 A | 12/1971 | Liepa | |
| 4,170,659 A | 10/1979 | Totino et al. | |
| 4,187,771 A | 2/1980 | Westover et al. | |
| 4,923,705 A * | 5/1990 | Mottur et al. | 426/438 |
| 5,322,006 A | 6/1994 | Morioka | |
| 5,392,698 A * | 2/1995 | Sprecher et al. | 99/443 C |
| 6,412,397 B1 | 7/2002 | McNeel et al. | |
| 6,830,767 B2 | 12/2004 | Teras et al. | |
| 2002/0122852 A1 | 9/2002 | Zimmerman | |
| 2002/0168453 A1 | 11/2002 | McCutchan | |
| 2004/0139861 A1* | 7/2004 | Dove et al. | 99/404 |

FOREIGN PATENT DOCUMENTS

| | | |
|---|---|---|
| JP | 63-309218 | 12/1988 |
| JP | 08-308522 | 11/1996 |
| WO | WO 96/01572 | 1/1996 |
| WO | WO 01/84957 | 11/2001 |
| WO | WO 01/91561 | 12/2001 |
| WO | WO 01/91583 | 12/2001 |

OTHER PUBLICATIONS

"Contour" in Merriam-Webster OnLine, Nov. 14, 2008, p. 1, www.merriam-webster.com.*
"Conforms" in Merriam-Webster OnLine, Nov. 14, 2008, p. 1, www.merriam-webster.com.*

* cited by examiner

*Primary Examiner* — Elizabeth Gwartney
(74) *Attorney, Agent, or Firm* — Bobby W. Braxton; Colin P. Cahoon; Carstens & Cahoon, LLP (57) ABSTRACT

A method and apparatus to impart a random curvature to frying pre-formed snack pieces in a multi-layer fryer through the use of a contoured submerger. The shape of the contours of a contoured submerger imparts a random final curvature to each snack piece as snack pieces pass through a glass transition during frying. The contours are chosen so as to achieve a desired bulk density for the packaged fried snack products. Such method and apparatus are also useful in controlling the amount of change in bulk density or amount of settling of a packaged product during shipping or handling.

17 Claims, 5 Drawing Sheets

METHOD FOR CONTROLLING BULK DENSITY OF FRIED SNACK PIECES

BACKGROUND

1. Technical Field

The present invention relates to a method to control the bulk density of packaged fried snack pieces. More specifically, this invention relates to imparting a random shape or curvature to each snack piece during cooking or frying in such a way as to control the resultant bulk density of such product when packaged.

2. Description of Related Art

Random Frying

In the food industry, there are two typical methods of frying snack pieces such as potato chips: random frying and constrained frying. One popular random frying method is to fry uncooked pre-formed snack pieces in a random frying section of a multi-layer continuous fryer and allow buoyancy forces to impart a random shape or curvature to each snack piece. Several patents illustrate such random frying methods, as those disclosed in Pringle et al., U.S. Pat. No. 2,286,644 entitled "Method and Apparatus for Processing Potatoes" issued Jun. 16, 1942, and Anderson et al., U.S. Pat. No. 3,149,978 entitled "Process for Cooking Corn Dough in the Form of Chips" issued Sep. 22, 1964 and assigned to Arthur D. Little, Inc.

U.S. Pat. No. 3,608,474 issued Sep. 28, 1971 to Liepa, discloses a random frying method for making potato chip products. Liepa '474 suggests slicing raw potatoes, cooking these loose slices in a reservoir of hot oil for a predetermined time where the slices are fried to a crisp state, and then removing the fried chips from the oil. The chips so prepared have a random surface curvature which is influenced by the diameter and thickness of the potato slices and is dependent both upon the amount of time the slices are immersed in the hot oil and the temperature of the oil. In the prior art, a constrained or form frying method is difficult to use with snack pieces of different sizes or shapes. Instead, random frying is typically used on these pieces of varying size or shape.

Liepa '474 also teaches that the random shapes which the chips assume require that they be randomly packaged. Random packing is used because it is relatively cheap, requires less energy and is less complicated than packing snack pieces into a high-density nested arrangement or packed alignment. Randomly packed snack piece packages require larger amounts of store shelf and consumer pantry shelf space. Generally, when a consumer opens such package, the snack pieces have settled and the bulk density has increased leaving a substantial void within the package. It would be ideal if the randomly packed pieces filled the entire package at the time the package is opened even after some settling occurred during shipping and handling.

Figure 1:
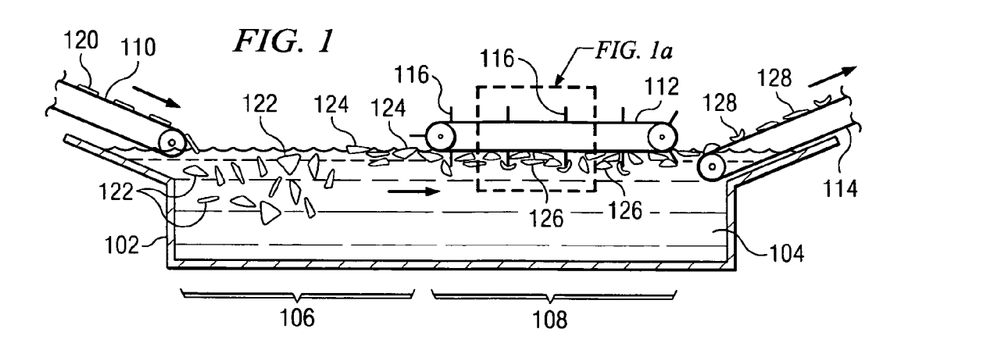
FIG. 1 is a side cross-sectional view of a continuous fryer apparatus with a continuous submerging conveyor according to the prior art.

According to the prior art, and with reference to FIG. 1, uncooked chip pre-forms 120 are continuously fed by an entrance conveyor 110 into cooking oil 104 of a random frying section 106 of a continuous fryer 102. In a continuous fryer 102, cooking oil 104 generally flows from an entrance conveyor 110 toward an exit conveyor 114 carrying chip pre-forms 122 with it. As relatively moist chip pre-forms 122 are first introduced into cooking oil 104, their weight 122 is usually greater than the buoyancy forces acting on them and the moist chip pre-forms 122 remain submersed in the oil without aid. As chip pre-forms 122 continue to cook and move along the path inside the continuous fryer 102 (from left to right in FIG. 1), moisture escapes from the chip pre-forms 122 and the buoyancy forces become greater than the weight of the chip pre-forms 122. At that point, the chip pre-forms 124 generally float near the surface of the oil as they approach a prior art submerger 112. At this point, chip pre-forms 124 are generally, not rubbery, and do not have a tendency to stick to each other.

A prior art submerger 112 generally turns at a speed slower than the flow of cooking oil 104. A prior art submerger 112 usually has one or more optional and generally straight paddles, cleats or fins 116. These fins 116 help gather the roughly monolayer of floating chip pre-forms 124 into a multi-layer of submerged chip pre-forms 126. The fins 116 also help ensure that submerged chip pre-forms 126 do not clump or stick together. By submerging the cooking chip pre-forms 126, the pre-forms 126 are more evenly cooked on both sides. Cooked chips 128 leave the prior art submerger 112 and exit the continuous fryer 102 on an endless exiting conveyor 114.

Figure 1A:
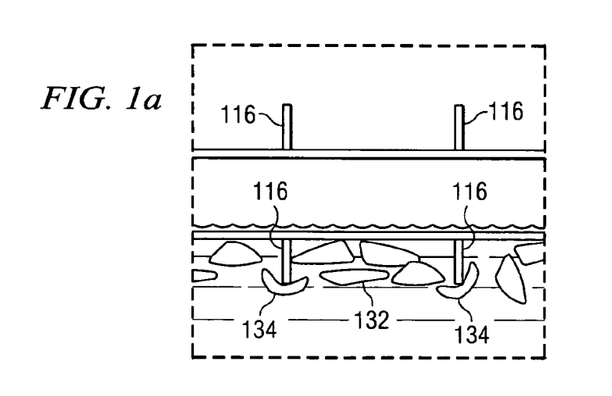
FIG. 1a is a close-up view of the continuous submerging conveyor shown in FIG. 1.
Figure 6:
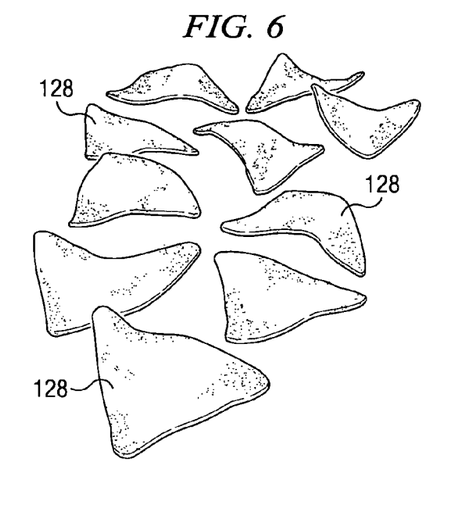
FIG. 6 is perspective view of triangular cooked snack pieces cooked under a flat submerger according to the prior art illustrating typical, slight, naturally-occurring curvatures of the cooked product.
Figure 7:
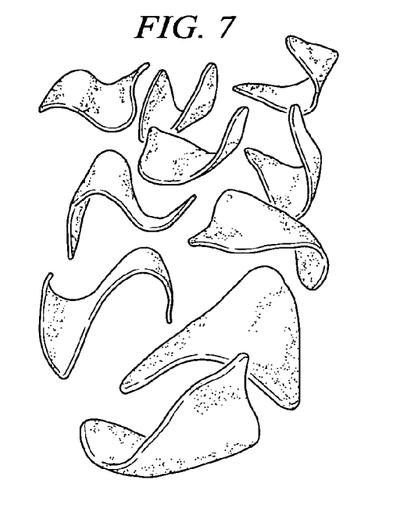
FIG. 7 is perspective view of triangular cooked snack pieces cooked according to one embodiment of the present invention showing randomly generated curvatures imparted by a contoured submerger.

According to the prior art, reference to FIG. 1a, the majority of submerged chip pre-forms 132 lay flat as they are transported along the cooking path. These pre-forms 132 leave the continuous fryer as generally flat cooked chips; any curvature in the cooked chips 128 is the result of random cooking forces acting on a submerged chip pre-form 132. However, by chance a few submerged chip pre-forms 134 overlap or randomly press against a fin 116 or another submerged chip pre-forms 132 in such a way as to gain an exaggerated curvature. FIG. 6 illustrates typical resulting shapes of triangular snack pieces cooked according to the prior art. The snack pieces 128 are generally flat, but some have a minimal curvature. More or less curvature can be obtained by using the method of constrained frying.

Constrained Frying

The other typical method of frying snack pieces is through the use of constrained or form frying. Several patents disclose methods of imparting a curvature to chip-type products made from a dough sheet by constrained frying methods. For example, a method to produce rippled chip-type products is disclosed in U.S. Pat. No. 2,286,644 by Pringle et al., issued Jun. 16, 1942 entitled "Method and Apparatus for Processing Potatoes." Other U.S. patents disclose other similar methods to impart a desired final curvature or shape to a snack piece. In U.S. Pat. No. 3,998,975 issued Dec. 21, 1976, Liepa et al. discloses a method to form uncooked snack pieces into a desired shape by drying the pieces sufficiently and frying the pieces to a finished state before packaging.

In U.S. Pat. No. 3,576,647 issued Apr. 27, 1971, Liepa discloses a constrained frying method wherein mold halves each provide multiple openings distributed over the mold surfaces to permit the frying oil to pass through and come into contact with the constrained food product. The mold halves cooperate to hold the dough sections and restrain them during the frying so that the fried products conform in surface curvature with that of the mold surfaces. Similarly, in related U.S. Pat. No. 3,608,474 issued Sep. 28, 1971, and U.S. Pat. No. 3,626,466 issued Dec. 7, 1971, Liepa discloses the same molds and passes them through frying oil and form-fries dough pre-forms into crisp chips thereby imparting a uniform size and shape to each chip.

U.S. Pat. No. 3,520,248, issued Jul. 14, 1970 to MacKendrick, discloses a machine to continuously and uniformly cut and cook snack pieces or chips from a sheet of dough. MacKendrick discloses a machine to positively convey snack pieces through the frying medium in the same controlled manner as disclosed by Liepa '474 where the resulting chips have a uniform color, texture, and shape. The MacKendrick invention improves the Liepa '474 machine by using a reciprocating cutter in place of a rotary cutter which can be operated at significantly higher speeds.

U.S. Pat. No. 3,149,978 entitled "Process for Cooking Corn Dough in the Form of Chips" granted on Sep. 22, 1964 to Anderson et al., teaches a method of imparting a controlled bent configuration to a corn masa dough chip which is cooked by deep-fat frying. Further, this invention teaches an apparatus for inducing a desired shape to the corn chips during cooking. The desired configuration is done through the use of a series of parallel wires which are mounted on a frame such that the wires may be controllably moved within the oil. The spacing of the wires is adjusted so that it is somewhat less than the diameter or maximum dimension of the chip which is to be cooked. The wires may be periodically immersed into the cooking oil to strike a portion of the cooking chips and then withdrawn. When forcing the parallel wires into the cooking oil, the wires impart a curvature to the chips either when the wires strike the chips, pushing them deeper into the oil, or when the chips rise after being pushed momentarily deeper into the cooking oil, or by a combination of these actions. By this process not all of the chips are contacted and bent. Anderson et al. '978 teaches that it is preferred not to give a bend to all of the chips because it is desirable to package corn chips which are a combination of those having a flat and bent configuration, the latter amount consisting of about 25% to 75% of the total number of chips.

In a recent U.S. patent application, Dove, et al. discloses a single mold fryer. A single layer of cooking chips are given a uniform shape as chips are disposed against a curved or contoured submerged conveyor surface or mold surface by buoyancy forces. The Dove patent application has the same assignee as the present application and is entitled "Single Mold Form Fryer with Enhanced Product" having a filing date of Jan. 21, 2003 and Ser. No. 10/347,993. Such form frying imparts a relatively predictable and uniform shape to each snack piece, not a random curvature.

Figure 2:
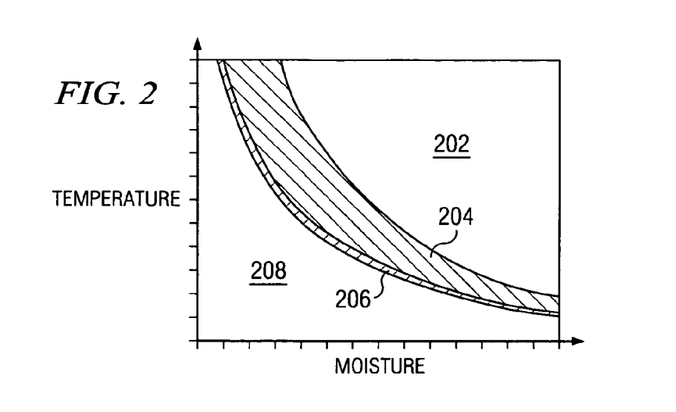
FIG. 2 is a generic rubber/glass transition diagram for a polymeric substance such as a dough used for making snack pieces or chips showing temperature increasing from bottom to top on the vertical axis, and moisture content increasing from left to right on the horizontal axis.

Anderson et al. '978 mentioned above teaches that curvature must be imparted during frying before a critical time when the frying chips assume their permanent configuration or shape. This critical time occurs when a given dough formulation reaches a glass transition point. FIG. 2 illustrates the various states of a generic polymer-like substance such as dough. Referring to FIG. 2, polymer substances and farinaceous dough formulations can be pliable 202, rubbery 204 or glassy 208 at a given temperature depending on the composition of the substance. The state of a dough is especially dependent on moisture concentration. In a typical case, the state of an edible chip product made of a given dough formulation, as it loses moisture while cooking at a constant given temperature, moves from a pliable rubbery state 204 through a glass transition state 206 into a permanent glassy state 208. As the chip is cooled and subsequently packaged, the chip remains in a glassy state 208. It is at the glass transition state 206 where a cooking chip pre-form loses its pliability and assumes its final shape. The glass transition state 206 is somewhat of a misnomer since the term "transition" implies an equilibrium phenomenon that is invariant to the speed of the heating, cooling or other conditions. The actual transition point for a given product formulation may depend on the speed at which a substance is heated, cooled, or dehydrated (cooked).

Packaging

Cooked snack products are generally packaged in a random fashion in a bag or other similar container. Such random packing leads to a packaged product with a certain, relatively low bulk-density. Packages with low bulk density are essentially packages wherein the volume capacity of the package is much greater than the absolute volume of the snacks contained inside. The package could contain a much higher net weight of snack pieces than the volume capacity of the package if the pieces were not randomly packaged. This inefficiency is especially evident when chips have settled during shipping.

Curved snack pieces generally have a lower bulk density when randomly packed as compared to generally flat snack pieces when randomly packed. Curved snack pieces tend not to seat against one another and tend to leave relatively larger voids between pieces as compared to flat snack pieces. In U.S. Pat. No. 4,844,919, issued on Jul. 4, 1989, Szwerc teaches that the use of curved pieces lowers packed product bulk density. Szwerc '919 teaches that the snack piece's thickness, curvature, weight and orientation must be considered and potentially optimized to achieve densities above those obtained by randomly packing such pieces. Szwerc '919 teaches the production of curved snack chips by baking. In U.S. published patent application Ser. No. 09/851,040 entitled "Snack Piece Having Increased Packed Density," Zimmerman et al. teaches that the shape and thickness of snack pieces can contribute to lower packed densities. Zimmerman teaches that the interference between adjacent snack pieces due to irregular sizing leads to increased space between nested pieces, subsequently leading to a lower bulk density.

However, the prior art does not teach methods which would provide sufficient control of the snack piece's thickness, curvature, weight, orientation, or shape to achieve a desired bulk density. Currently, the food industry does not design a product to have desired bulk density. The food industry conforms the size of a product package to a desired weight of randomly-packed product. The package is sufficiently large to accommodate variations in bulk density. Consequently, a need exists for a method to permanently impart a particular shape to snack pieces in such a way as to produce a snack product that will have a desired bulk density when randomly packaged. Further, a need exists for producing such a snack product without lowering the productivity or throughput of the process.

Further, a need exists for a method to control the amount of change in bulk density during the time a snack product package is exposed to settling forces during shipping and handling. Specifically, a need exists to prevent settling of chips wherein a substantial void remains in the product package. A need exists for an optimal packing that would also minimize breakage of chips. The benefit of filling this need would be an improved perception by consumers that the package is more substantially filled with product. Further, there is a need for loosely packed consumer products. In such a case there would be a lower bulk density and less shingling of chips within each package.

Further, a need exists for a method and apparatus which cooks snack pieces with a more consistent, controlled, and predictable cooking time. Such method and apparatus would produce chips with a more uniform color and texture. Such a method and apparatus would meet these criteria and could be used in a high-speed production environment. It is therefore an object of this invention to provide a method of imparting a controlled bent configuration to fried snack product pieces. These and other objects will become apparent in the following detailed description.

SUMMARY OF THE INVENTION

A method and apparatus are disclosed which provide packaged fried snack products having a desired bulk density without reducing production efficiency or throughput. Such method and apparatus are also useful in controlling the amount of change in bulk density or amount of settling of a packaged product when exposed to settling forces during shipping or handling. The shape of a contoured submerger imparts a random curvature to, and determines the final shape of, each snack piece before and during dehydration through the glass transition of the snack piece during frying.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

| Reference Numerals | |
|---|---|
| 102 | continuous fryer |
| 104 | frying or cooking oil |
| 106 | random frying section of continuous fryer |
| 108 | submerging section of continuous fryer |
| 110 | entrance conveyor |
| 112 | prior art submerger |
| 114 | exit conveyor |
| 116 | paddle or fin |
| 120 | uncooked chip pre-form |
| 122 | frying chip pre-form |
| 122 | moist chip pre-form |
| 124 | rubbery floating chip pre-form |
| 126 | submerged chip pre-form |
| 128 | cooked snack pieces |
| 132 | submerged chip pre-form |
| 134 | submerged chip pre-form with exaggerated curvature |
| 202 | pliable state |
| 204 | rubbery state |
| 206 | glass transition state |
| 208 | glassy state |
| 302 | cooking chip pre-form |
| 304 | distance between subsequent contours |
| 306 | contours of the submerger |
| 308 | batch fryer oil |
| 310 | contoured submerger |
| 320 | batch fryer |
| 402 | chip pre-form conformed to contour of contoured submerger |
| 404 | contoured submerger having V-shaped contour profile |
| 406 | contoured submerger having V-shaped contour profile |
| 512 | contoured submerger |
| 516 | contours of contoured submerger |
| 518 | contour spacing |
| 512 | first contoured submerger |
| 512 | endless contoured submerger |
| 526 | cooking chip pre-form |
| 528 | shaped cooked snack piece |
| 530 | contour height |
| 542 | subsequent submerger |
| 802 | cylindrical container |
| 804 | void space |
| 806 | control snack piece |
| 904 | shaped snack piece |
| 1002 | V-shaped contour profile having uniform spacing |
| 1004 | V-shaped contour profile having non-uniform spacing |
| 1006 | sinusoidal contour profile having uniform spacing |
| 1008 | sinusoidal contour profile having non-uniform spacing |
| 1010 | crenellated contour profile having uniform spacing |
| 1012 | contour profile having tapered crenellations and non-uniform spacing |
| 1014 | contour profile composed of non-uniformly sized spheres |
| 1016 | contour profile composed of conical protrusions |

DETAILED DESCRIPTION

While the invention is described below with respect to a preferred embodiment, other embodiments are possible. The concepts disclosed herein apply equally to other systems for frying various types of pliable snack pre-forms and imparting a random curvature to each snack piece.

The volume occupied by curved snack pieces is dependent upon the specific shape, dimensions, and arrangement of the individual snack pieces. In the present invention, randomly packed chips have a volumetric bulk density defined herein as the net weight of packaged snack pieces per the absolute volume of the container holding the snack pieces. Absolute volume, as used herein, is defined as the total liquid volume of the container holding the randomly packed snack pieces. As one example, the bulk density of randomly packed snack pieces can be measured by filling a cylindrical container of known volume and subsequently measuring the net weight of the container. The container is not packed or disturbed during the filling: the pieces may settle and ultimately take up less volume when exposed to settling forces. The bulk density after being exposed to such forces is termed the settled bulk density.

To control bulk density of snack pieces formed from a dough sheet, it is necessary to control the shape and curvature of each piece. However, merely creating snack pieces with curvature does not always produce higher or lower bulk densities as compared to flat pieces. A snack piece's thickness, curvature, weight and orientation must be considered and potentially optimized to achieve a desired bulk density. A desired bulk density may be obtained by imparting a certain random curvature to each snack piece.

Snack pieces generally achieve their final shape during their transition from a rubbery state to a glass state as pre-form snack pieces are cooked, usually by frying, as explained previously and with reference to FIG. 2. A random curvature can be imparted to each snack piece during frying in a batch fryer using a contoured submerger while each snack piece transitions from a rubbery state to a glass state.

Figure 3:
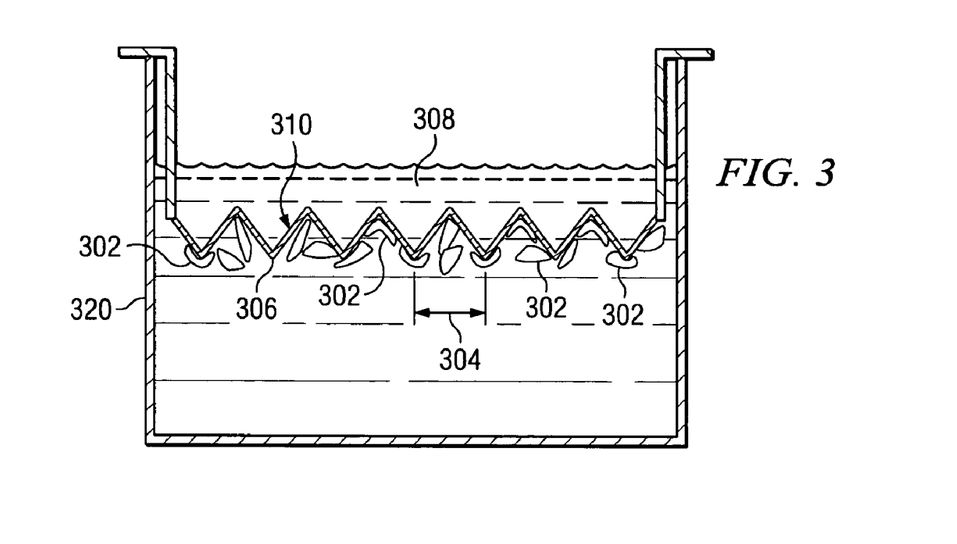
FIG. 3 is a side cross-sectional view of a batch fryer having a contoured submerger which imparts a random curvature to cooking chip pre-forms according to one embodiment of the present invention.

In one embodiment, and with reference to FIG. 3, chip pre-forms 302 are placed in a batch fryer 320 underneath a contoured submerger 310. As the chip pre-forms 302 cook, they are maintained against the contours of a contoured submerger 310 by buoyancy forces acting on the cooking chip pre-forms 302. The chip pre-forms 302 are given a random shape by the contours 306 of the submerger 310 as the chip pre-forms 302 are cooked. After a certain time, the cooked chips 302 are removed from the fryer 320 and may be further processed and packaged.

Figure 5:
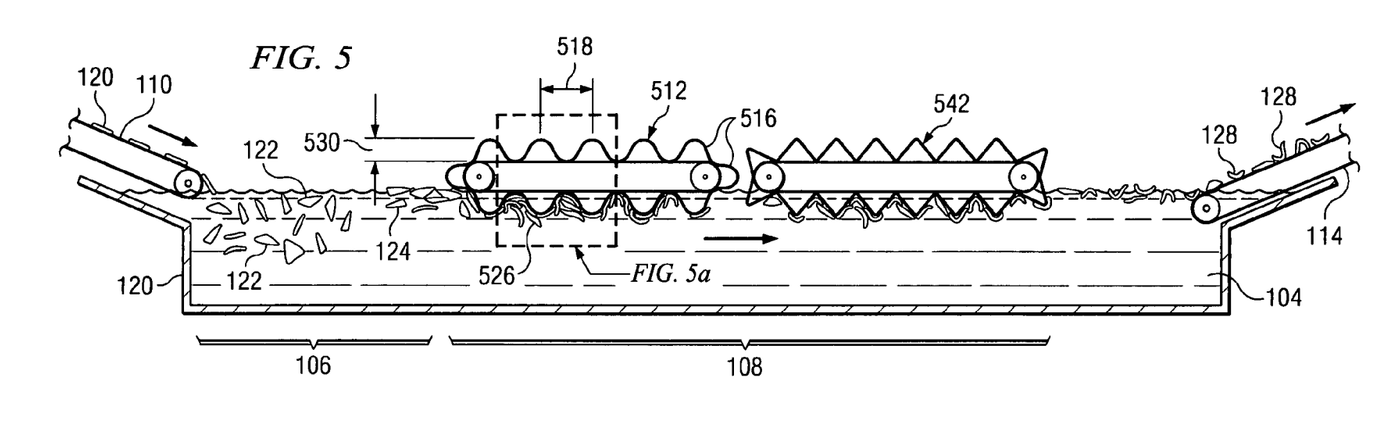
FIG. 5 is a side cross-sectional view of a continuous fryer apparatus with a continuous contoured submerging conveyor according to one embodiment of the present invention.

In another embodiment and with reference to FIG. 5, chip pre-forms 120 are first introduced continuously into a random frying section 106 containing frying oil 104 in a continuous fryer 102. As randomly frying chip pre-forms 122 lose sufficient moisture, typically having from 30 to 60 percent moisture when first introduced into the oil 104, and having about eight to fifteen percent moisture by weight when reaching a contoured submerger 512, they no longer have a tendency to stick to one another. At this point, the rubbery chip pre-forms 124 can be submerged beneath an endless contoured submerger 512. If frying chip pre-forms 122 reach, and are cooked under, a contoured submerger 512 with a higher than about ten percent moisture content, either in a single layer or in multiple layers, sticking and/or clumping can occur.

With reference to FIG. 5, in a preferred embodiment, as rubbery chip pre-forms 124 reach a contoured submerger 512, the chip pre-forms 124 are aggregated and submerged for further cooking. An endless contoured submerger 512 generally does not cover the entire length of a random fryer 102. Chip pre-forms made of cereal flour and/or tuber flour have a residence time from about 15 to 90 seconds. Submerged chip pre-forms 526 may overlap to a lesser or higher degree such that there are multiple layers of chip pre-forms 526 along the length of the contoured submerger 512. While chip pre-forms 526 are losing moisture through cooking under the contoured submerger 512, the chip pre-forms 526 are going from a rubbery state through a glass transition and into a glass state. The final shape of each piece is obtained as each chip reaches this glass state. For a typical dough formulation, when cooking chip pre-forms 526 have about five percent moisture by weight, these pre-forms may be removed from the contoured submerger 512 without affecting the final shape of the finished shaped chip product 528.

With reference to FIG. 5, a contoured submerger 512 in a submerging section 108 of a continuous fryer 102 has contours 516 differing substantially from the prior art. A contoured submerger 512 is not merely a submerging conveyor belt with fins, as shown in a typical prior art embodiment in FIG. 1. In one embodiment of the invention, a contoured submerger 512 has a V-shaped profile wherein each contour 516 has a contour height 530. The distance between sequential contours 516 is the contour spacing 518. In one embodiment, the contour spacing 518 is uniform from contour 516 to contour 516. However, in other embodiments, the contour spacing 518 may be different between successive contours 516.

The contours 516 provide improved aggregation of cooking rubbery chip pre-forms 124 as they reach a first contoured submerger 512. Generally, per unit length of conveyor, there are more contours 516 than submerger fins (116 in FIG. 1). Contours are generally used in lieu of submerger fins and give improved functionality. With the use of contours 516, each submerged chip pre-form 526 is forced under the oil 104 more consistently as the contours 516 of a first contoured submerger 512 engage the arriving rubbery chip pre-forms 124. Since the contour spacing 518 is generally shorter than the distance between sequential fins on a prior art submerging conveyor, the submerged chip pre-forms 526 move along in improved plug flow.

Figure 5A:
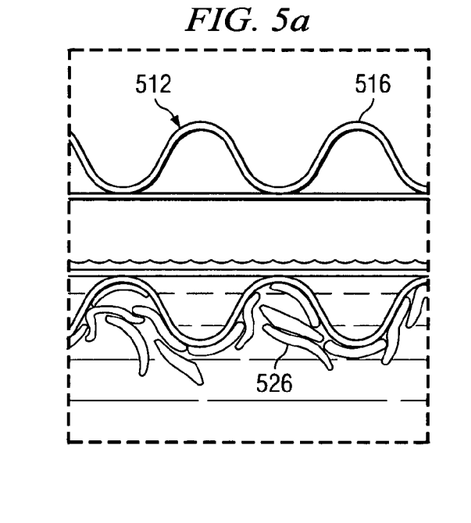
FIG. 5a is a close-up view of a continuous fryer apparatus with a continuous contoured submerging conveyor according to one embodiment of the present invention.

With reference to FIG. 5a, while the cooking chip pre-forms are pressed upward against the contours 516 of a contoured submerger by buoyancy forces, these pieces conform to the curvature or shape of the contours 516. Because each piece 526 is located at a random place along the contours 516, a random shape is imparted to each piece 526. A preferred random curvature, and resultant bulk density, is obtained when the spacing between adjacent contours 518 is larger than the largest dimension of each snack piece 526. However, other spacing of contours 518 can be used to produce finished shaped pieces 528 having a desired bulk density. The final curvature of each shaped, cooked piece 528 is dependent upon the overall profile or shape of a contoured submerger 512, the spacing between subsequent contours 518, the number of layers of cooking pre-forms 526 beneath the submerger 512, and the dough formulation and shape of each pre-form 526. A contour depth 530 of a contoured submerger 512 may be any size and may vary from contour 516 to contour 516. However, the contour depth 530 is preferably large enough to accommodate multiple layers of cooking chip pre-forms 526 while maintaining all such pre-forms 526 in plug flow as the contoured submerger 512 directs them toward a fryer exit conveyor 114.

In another embodiment, chip pre-forms 526 are maintained for a short duration in multiple layers on a first contoured submerger 512. The duration depends upon the moisture content of the submerged cooking chip pre-forms 526. The chip pre-forms obtain their final shape under a first contoured submerger 512 by passing into a glass state. At this point, cooking chip pre-forms 526 may pass to subsequent submergers without losing their shape. Subsequent submergers aid in cooking the cooking chip pre-forms 526 until they have a final desired moisture content; in one embodiment, a final moisture content is about two percent by weight. A final moisture content may be as low as one percent. Subsequent submergers may not be of the same shape, speed, contour, or size of a first contoured submerger 512. Subsequent submergers may even resemble prior art submergers.

In a further embodiment, submerged cooking chip pre-forms 526 are not in their final shape when passed to subsequent submergers. In such an embodiment, submerged chip pre-forms 526 obtain an initial shape from a first contoured submerger 512, and their final shape from subsequent submergers. Such submerged chip pre-forms pass into a glass state under subsequent submergers. Finished shaped chip products 528 are removed from the cooking oil 104 on an exit conveyor 114.

Finished chip products 528 are subsequently packaged. Such finished chip products generally have a lower bulk density, and thus fill more of a container, even after finished chip product packages are exposed to settling forces such as during shipping and handling. Such lower bulk density generally provides finished chip products with higher consumer appeal than finished chip products having a higher bulk density.

Figure 10:
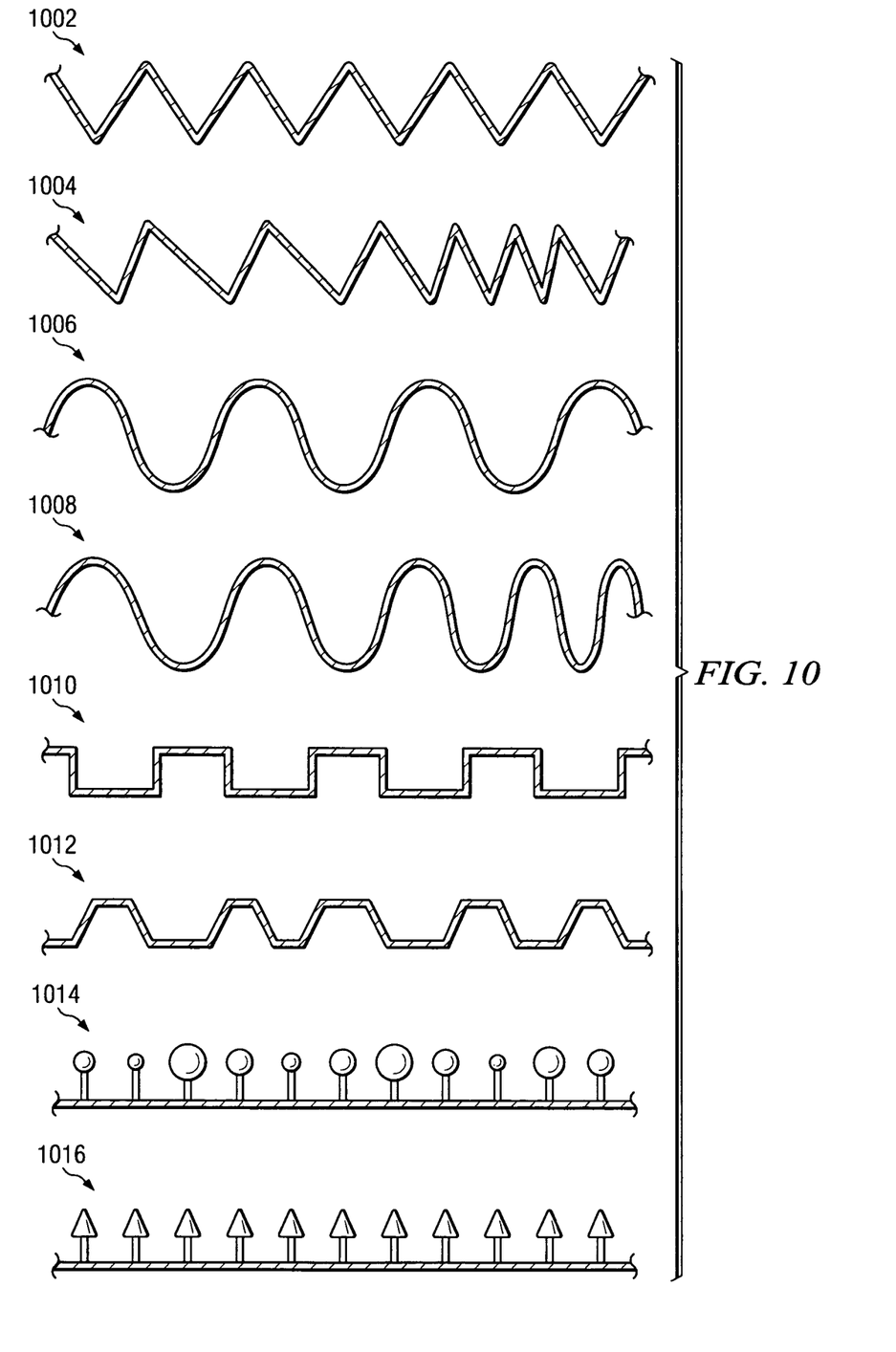

Various embodiments of a contoured submerger are envisioned. FIG. 10 illustrates some of the various profiles or contours that may be used within the spirit of this invention. In certain embodiments, contours in a continuous fryer 102 generally lie perpendicular to the flow of chip pre-forms 302. However, the contours may run in any direction, or may have no direction or may have no uniform shape at all. The contours may even lie parallel to the flow of oil and chip pre-forms 302 in a continuous fryer 102. The contours may be composed of a non-repeating, non-continuous set of surface features.

With reference to FIG. 10, in one embodiment, a contoured submerger has a V-shaped profile having uniform contour spacing 1002, or alternatively, with non-uniform contour spacing 1004. In an alternate embodiment, a contoured submerger has a sinusoidal profile with uniform contour spacing 1006, or with non-uniform contour spacing 1008. In still another embodiment, a contoured submerger has a crenellated profile 1010 that may or may not have uniform contour spacing. A variation of this embodiment is a contour profile having crenellations that are each tapered 1012, and wherein the contour spacing may or may not be uniform.

In another embodiment, a contoured submerger is composed of non-uniformly sized spheres 1014 or, alternatively, conical protrusions 1016. In a variation of such embodiment, a contoured submerger may be composed of a variety of similar shapes and/or profiles described herein. A contoured submerger may also have three dimensional contour profiles such as, but not limited to, an egg carton-like profile having peaks and valleys at regular or irregular intervals. Such embodiments shown in FIG. 10 are by way of illustration and not limitation. The following examples more fully illustrate the practice of the invention.

EXAMPLE 1

In a first example, various contoured submergers having different shapes or contours were used to cook chip pre-forms shaped as equilateral triangles. With reference to FIG. 3, various shapes or profiles of a contoured submerger 310 were tested in a batch fryer 320 so as to affect the bulk density of a particular formulation and shape of snack piece. In this example, one contoured submerger 310 was shaped as a sinusoidal wave, and the bulk density of the resultant cooked snack pieces was about 7.5 lb/cu. ft. (0.0694 oz/cu. in.; 0.120 g/cu. cm) from that shape. Using a different contoured V-shaped submerger 310, the resultant bulk density of snack pieces was about 6.25 lb/cu. ft. (0.0579 oz/cu. in.; 0.100 g/cu. cm). Using various shapes of contoured submergers, resulting cooked and packaged chips had a bulk density over the range from about 6.0 lb/cu. ft. (0.0556 oz/cu. in.; 0.096 g/cu. cm) to about 7.5 lb/cu. ft. (0.0694 oz/cu. in.; 0.120 g/cu. cm) when cooked with these shaped or contoured submergers. Finally, a flat contoured submerger, as understood and routinely used in the prior art, was used to cook pre-form snack pieces of the same shape, the pieces cooked therewith serving as a reference. The bulk density from the use of the flat contoured submerger 310 was about 8.5 lb/cu. ft. (0.0787 oz/cu. in.; 0.136 g/cu. cm).

EXAMPLE 2

Figure 4:
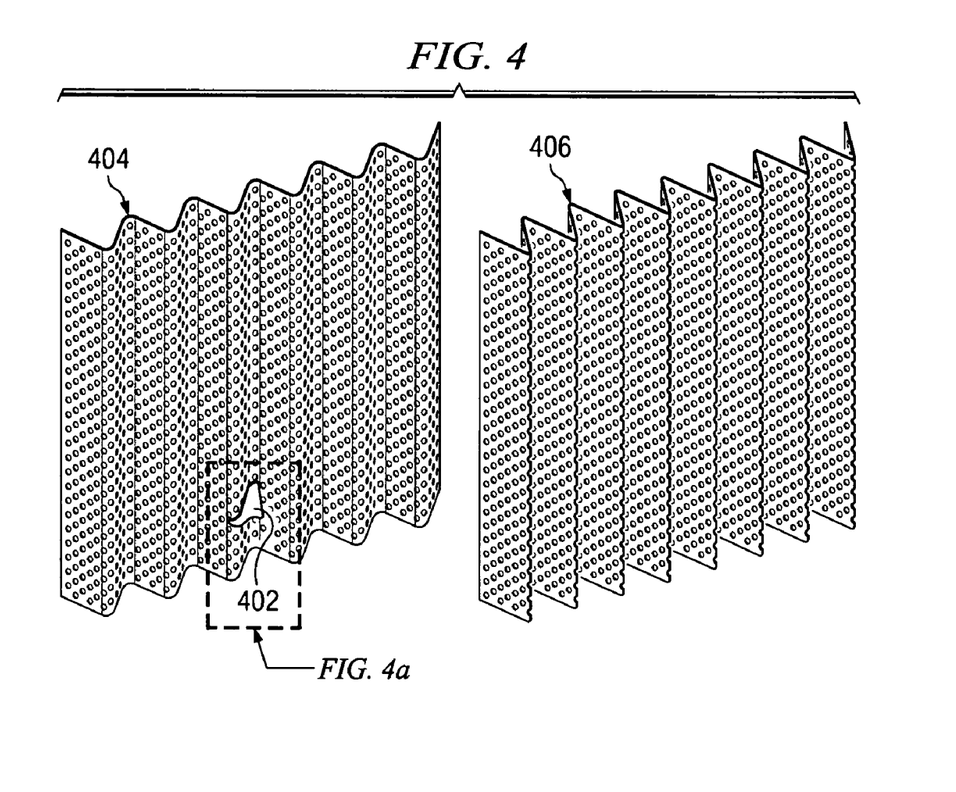
FIG. 4 is a perspective view of two contoured submergers used in embodiments of the invention each with a different V-shaped contour profile or cross-sectional shape.
Figure 4A:
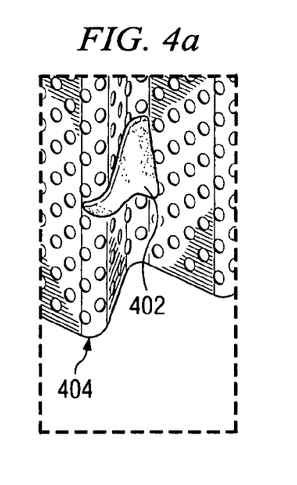
FIG. 4a is a close-up view of one of the contoured submergers shown in FIG. 4 showing a triangular chip pre-form pressed against one of the contours of the submerger.

In a second example of the present invention, two contoured submergers, differing from the submergers used in Example 1, and having different V-shaped profiles, were evaluated as to their effect on the bulk density of a snack product. Batches of snack product pre-forms in the shape of equilateral triangles were made from a dough sheet before being batch fried. The pre-forms in Example 2 were made from a dough formulation substantially different from that used in Example 1. The bulk density of pieces fried under the two contoured submergers in this example were compared against the bulk density of pieces fried under a control contoured submerger: a flat stainless steel perforated sheet or steel mesh. The two contoured submergers 404, 406 of Example 2 are shown in FIG. 4 and both have V-shaped contour profiles. One contoured submerger 404 has contours with a larger contour spacing, or distance between successive contours, as compared to the other contoured submerger 406.

With reference to Table 1, batches of pre-form pieces were cooked with each of the three submergers described previously, and the resulting weight and volume were recorded for each sample. The control batches numbered 1-3 in Table 1 were cooked under the control or flat submerger. With reference to FIG. 4, the S1 samples numbered 1-3 in Table 1 were cooked with the submerger having the more narrow V-shaped contours 406 as compared to the contours 404 of the submerger used to cook the S2 samples numbered 1-3.

Each batch of cooked chips of Example 2 were randomly packed into a rigid cylindrical container. Each batch received ten taps to simulate settling forces from shipping and handling. The volume after settling and the resultant settled bulk density of each batch are recorded in Table 1. For the control batches, the mean settled bulk density was 0.0506 ounces per cubic inch (oz/cu. in.) with a standard deviation of 0.0032 oz/cu. in. For the S1 samples, the mean bulk density was 0.0420 oz/cu. in. with a standard deviation of 0.0023 oz/cu. in. And for the S2 samples, the mean bulk density was 0.0366 oz/cu. in. with a standard deviation of 0.0010 oz/cu. in. These measurements of bulk density vary substantially from one another because of the differently shaped contours of the submerger used to cook the snack pieces.

TABLE 1

Results from frying snack pieces with two different V-shaped contoured submergers

| Sample | Weight, g | Initial Volume, L | Volume after Settling, L | Settled Bulk Density, oz/cu. in. | Settled Bulk Density, g/cu. cm |
|---|---|---|---|---|---|
| Control-1 | 302 | 4.0 | 3.7 | 0.0473 | 0.082 |
| Control-2 | 334 | 4.0 | 3.8 | 0.0508 | 0.088 |
| Control-3 | 353 | 4.2 | 3.8 | 0.0537 | 0.093 |
| S1-1 | 259 | 4.0 | 3.8 | 0.0393 | 0.068 |
| S1-2 | 285 | 3.9 | 3.8 | 0.0433 | 0.075 |
| S1-3 | 278 | 3.9 | 3.7 | 0.0434 | 0.075 |
| S2-1 | 256 | 4.2 | 4.0 | 0.0370 | 0.064 |
| S2-2 | 246 | 4.1 | 4.0 | 0.0355 | 0.061 |
| S2-3 | 245 | 4.1 | 3.8 | 0.0373 | 0.064 |

Figure 8:
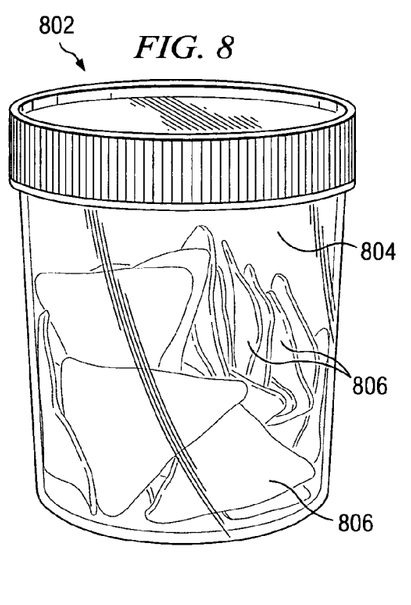
FIG. 8 is perspective view of a container of cooked snack pieces which were cooked under a flat submerger according to the prior art, and as shown in FIG. 6.
Figure 9:
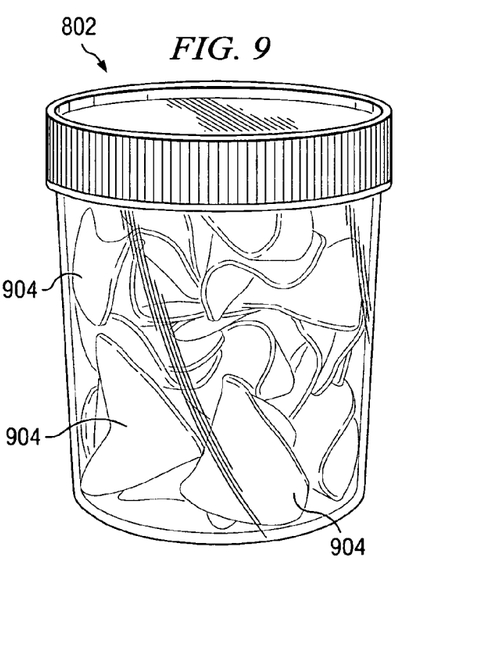
FIG. 9 is perspective view of a container of cooked snack pieces which were cooked according to the present invention under a contoured submerger, and as shown in FIG. 7; and, FIG. 10 is a side cross-sectional view of various possible configurations of cross-sectional shapes of a contoured submerger according to the present invention.

FIG. 8 and FIG. 9 are drawings taken from photographs of pieces packed in a cylindrical container. FIG. 8 shows control pieces 806 packed relatively densely. In FIG. 8, there are many snack pieces 806 which lie substantially parallel with one another. There is substantial settling as evidenced by the void 804 at the top of the container where chip pieces 806 initially filled the container 802. FIG. 9 shows S2 pieces 904 packed in an identical container 802. There are many more void spaces and there is much less settling since there is very little void space formed at the top of the container 802. The decreased bulk density, and thus larger volume of chips in the container, is generally preferred for appearance purposes by consumers.

While the invention has been particularly shown and described with reference to a preferred embodiment, it will be understood by those skilled in the art that various changes in form and detail may be made therein without departing from the spirit and scope of the invention.

We claim:

1. A method for producing snack product pieces having a random curvature and a bulk density, said method comprising the steps of:
    a) feeding snack product pre-forms into a fryer having fryer oil;
    b) submerging for a pre-determined time in said fryer oil said snack product pre-forms using a contoured submerger having at least two contours wherein each contour has a cross-sectional shape, a contour height, and a contour spacing;
    c) giving a random curvature to said snack product pre-forms using said contoured submerger;
    d) frying said snack product pre-forms to a desired moisture content in at least two submerged layers to form snack product pieces, wherein said at least two layers are formed on said contoured submerger, further wherein said pieces maintain said random curvature; and,
    e) moving said snack product pieces from said fryer.

2. The method of claim 1 wherein said contoured submerger of step b) is an endless contoured submerging belt, and wherein said fryer of step a) is a continuous fryer.

3. The method of claim 2 wherein said contours of said contoured submerger lie in a generally perpendicular direction relative to the motion of said contoured submerging belt.

4. The method of claim 1 wherein said cross-sectional shape of said contours of said contoured submerger of step b) is chosen so as to obtain a desired value of bulk density.

5. The method of claim 1 further comprising the steps of:
    f) packaging said snack product pieces of step e) in a container; and,
    g) settling said snack product pieces wherein said settled packaged snack product pieces have a desired settled bulk density.

6. The method of claim 1 wherein said cross-sectional shape of each said contour of said contoured submerger of step b) is selected from the group consisting of: sinusoidal, V-shaped, crenellated, and tapered-crenellated.

7. The method of claim 1 wherein said contour spacing of step b) is different between at least two pairs of said contours of said contoured submerger of step b).

8. The method of claim 1 wherein said contour height of one of said contours of said contoured submerger of step b) is different in size from the height of another of said contours.

9. The method of claim 1 wherein said contour height of step b) of at least one of said contours of step b) is greater than the largest dimension of said snack product pre-forms.

10. The method of claim 1 wherein at least one of said contour spacings of step b) is greater than the largest dimension of said snack product pre-forms.

11. The method of claim 1 wherein said random curvature of step c) is obtained by conforming the shape of said pre-forms to the shape of said contours.

12. The method of claim 1 wherein said submerger is not merely a contoured submerging conveyor belt with fins.

13. The method of claim 1 wherein said contours comprise more than a fin.

14. The method of claim 1 wherein said contours are not comprised solely of fins.

15. The method of claim 1 wherein said feeding of step a) comprises feeding said pre-forms into a random frying section before said pre-forms are introduced to said contoured submerger of step b).

16. The method of claim 15 wherein said pre-forms are fried to a moisture content of about 8 to 15% before being introduced to said contoured submerger.

17. The method of claim 1 wherein said at least two layers are formed vertically on said contoured submerger.

* * * * *